(12) United States Patent
Xu et al.

(10) Patent No.: US 8,723,473 B2
(45) Date of Patent: May 13, 2014

(54) CONTROL SYSTEM AND CONTROL METHOD OF A SOLAR POWER SUPPLY

(75) Inventors: Yang Xu, Guangdong (CN); Shulin Liang, Guangdong (CN); Jianhua Zhang, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 412 days.

(21) Appl. No.: 13/249,921

(22) Filed: Sep. 30, 2011

(65) Prior Publication Data

US 2012/0112684 A1   May 10, 2012

(30) Foreign Application Priority Data

Sep. 30, 2010   (CN) .......................... 2010 1 0296994

(51) Int. Cl.
*H01M 10/44* (2006.01)
*H01M 10/46* (2006.01)

(52) U.S. Cl.
USPC ........................................................ 320/101

(58) Field of Classification Search
USPC ........................................................... 320/101
See application file for complete search history.

(56) References Cited

U.S. PATENT DOCUMENTS

| | | | | |
|---|---|---|---|---|
| 5,280,827 A | * | 1/1994 | Taylor et al. | 180/165 |
| 5,644,207 A | * | 7/1997 | Lew et al. | 320/101 |
| 5,680,907 A | * | 10/1997 | Weihe | 180/2.2 |
| 2002/0000243 A1 | * | 1/2002 | Ganz | 136/244 |
| 2007/0285048 A1 | * | 12/2007 | Leach et al. | 320/101 |
| 2012/0133322 A1 | * | 5/2012 | Walsh et al. | 320/101 |

* cited by examiner

*Primary Examiner* — Arun Williams
(74) *Attorney, Agent, or Firm* — Finnegan, Henderson, Farabow, Garrett & Dunner, LLP

(57) ABSTRACT

A control system of a solar power supply for a vehicle is provided. The control system includes a solar battery pack and a control module. The solar battery is connected to an auxiliary power module, the control module, a DC/DC buck converter via a first switch, and connected to a DC/DC boost converter via a second switch. The DC/DC buck converter is connected to a low-voltage load, a starting battery and the control module. The DC/DC boost converter is connected to a high-voltage load, the control module, a power battery pack via a main contactor.

21 Claims, 3 Drawing Sheets

CONTROL SYSTEM AND CONTROL METHOD OF A SOLAR POWER SUPPLY

CROSS-REFERENCE TO RELATED APPLICATIONS

The present application claims priority to and benefits of Chinese Patent Application No. 201010296994.8 filed with State Intellectual Property Office of China on Sep. 30, 2010, the entirety of which is hereby incorporated by reference.

BACKGROUND

1. Technical Field

The present invention relates to control of a power supply for a vehicle, more particularly to a control system and control method of a solar power supply.

2. Description of the Related Art

To solve the problem of energy shortage and more and more severe environmental pollution, the new energy (including electric energy and solar energy) are utilized in vehicles. The utilization of the solar energy to charge the vehicle, not only reduces the environmental pollution and protects the environment, but also, prolongs the driving range of the vehicle.

At present, the application of the solar energy to electric vehicles is to provide power to the battery after starting the vehicle. The disadvantage is that: when the vehicle is parked, the solar energy is not used for the vehicle, not realizing maximum utilization of the solar energy to charge the vehicle.

SUMMARY

In view of the forgoing disadvantage in the known type of the vehicle utilizing the solar energy in the prior art, the present invention provides a control system and control method of a solar power supply for maximum utilizing the solar energy to provide power to vehicles, overcoming the problem that: when the vehicle utilizing the solar energy is parked, the solar energy is not used for the vehicle.

Accordingly, an embodiment of the present invention discloses a control system of a solar power supply, comprising a solar battery pack; a DC/DC buck converter; a DC/DC boost converter; a control module; a low-voltage load; a starting battery; a high-voltage load; a power battery pack; an auxiliary power module; a photosensitive sensor; a main contactor; a first switch; a second switch; a third switch; and a fourth switch; in which:

the solar battery pack is connected to the auxiliary power module and the control module respectively, connected to the DC/DC buck converter via the first switch and connected to the DC/DC boost converter via the second switch;

the DC/DC buck converter is connected to the low-voltage load, the starting battery and the control module respectively;

the DC/DC boost converter is connected to the high-voltage load and the control module respectively, and connected to the power battery pack via the main contactor;

the power battery pack is connected to a battery manager;

the control module is connected to the auxiliary power module, the battery manager and the photosensitive sensor;

the auxiliary power module is connected to the battery manager via the fourth switch; and the battery manager is connected to the starting battery via the third switch.

Another embodiment of the present invention discloses a control method of the aforementioned control system of the solar power supply, including:

when an output power of a solar battery pack is greater than a preset start power P of an auxiliary power module, the solar battery pack providing power to a control module via the auxiliary power module;

detecting a state of the vehicle;

when the vehicle is running, the solar battery pack providing power to a low-voltage load and starting battery via a DC/DC buck converter under the control of the control module;

when the vehicle is parked, the solar battery pack providing power to a power battery pack via a DC/DC boost converter under the control of the control module.

According to embodiments of the present invention disclosing the control system of the solar power supply, the present invention further comprises a solar battery pack; a DC/DC buck converter; a DC/DC boost converter; a control module; a low-voltage load; a starting battery; a high-voltage load; a power battery pack; an auxiliary power module; a photosensitive sensor; a main contactor; a first switch; a second switch; a third switch; and a fourth switch; in which:

the solar battery pack is connected to the auxiliary power module, the control module, the DC/DC buck converter via the first switch, and the DC/DC boost converter via the second switch;

the DC/DC buck converter is connected to the low-voltage load, the starting battery and the control module respectively;

the DC/DC boost converter is connected to the high-voltage load, the control module respectively, and the power battery pack via the main contactor;

the power battery pack is connected to a battery manager;

the control module is connected to the auxiliary power module, the battery manager and the photosensitive sensor;

the auxiliary power module is connected to the battery manager via the fourth switch; and the battery manager is connected to the starting battery via the third switch.

When the vehicle is running or parked, the solar power supply may provide power to the vehicle, realizing the maximum utilization of the solar energy and improving the utilization of the solar energy.

BRIEF DESCRIPTION OF THE DRAWINGS

These and other aspects and advantages of the invention will become apparent and more readily appreciated from the following descriptions taken in conjunction with the drawings in which.

DETAILED DESCRIPTION

Figure 1:
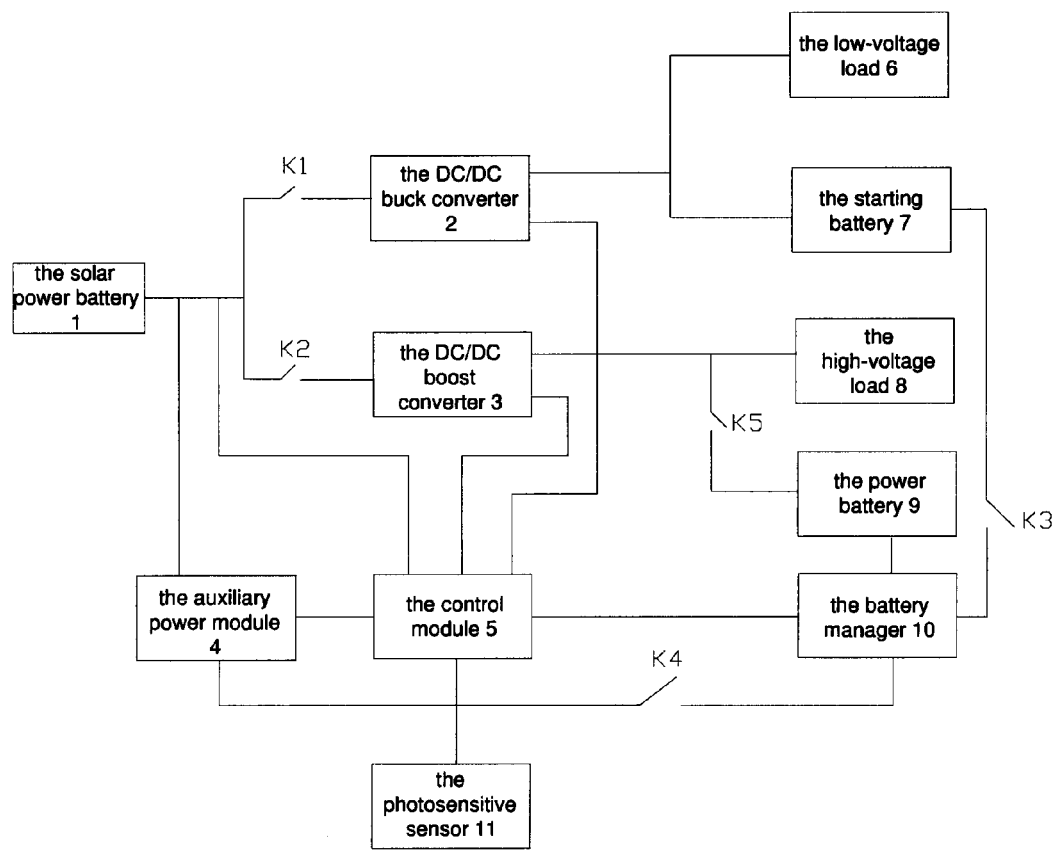
FIG. 1 is a schematic diagram illustrating a control system of a solar power supply according to an embodiment of the present invention.

Reference will be made in detail to embodiments of the present invention. The embodiments described herein with reference to drawings are explanatory, illustrative, and used to generally understand the present invention. The embodiments shall not be construed to limit the present invention. The same or similar elements and the elements having same or similar functions are denoted by like reference numerals throughout the descriptions.

As shown in FIG. 1, the schematic diagram illustrates a control system of a solar power supply according to an embodiment of the present invention. The control system of the solar power supply comprises a solar battery pack 1; a DC/DC buck converter 2; a DC/DC boost converter 3; a control module 5; a low-voltage load 6; a starting battery 7; a high-voltage load 8; a power battery pack 9; an auxiliary power module 4; a photosensitive sensor 11; a main contactor K5; a first switch K1; a second switch K2; a third switch K3; and a fourth switch K4. The solar battery pack 1 is connected to the auxiliary power module 4 and the control module 5 respectively, connected to DC/DC buck converter 2 via first switch K1 and connected to DC/DC boost converter 3 via second switch K2. The DC/DC buck converter 2 is connected to low-voltage load 6, starting battery 7 and the control module 5 respectively. The DC/DC boost converter 3 is connected to high-voltage load 8 and the control module 5 respectively, and connected to power battery pack 9 via main contactor K5. The power battery pack 1 is connected to battery manager 10. The control module 5 is connected to the auxiliary power module 4, the battery manager 10 and photosensitive sensor 11. The auxiliary power module 4 is connected to the battery manager 10 via fourth switch K4. The battery manager 10 is connected to starting battery 7 via third switch K3.

The low-voltage load 6 is a series load connected to the starting battery 7 comprising lamps, instrument panels, wipers, etc. The high-voltage load 8 is the load to which the power battery pack 9 directly provides power, comprising air conditioners, steering electromotor, air compressors, wheel motors, etc.

In some embodiments, the first switch K1, the second switch K2, the third switch K3, and the fourth switch K4 are preferably electric control relays. In some other embodiments, the switches K1, K2, K3, and K4 may be manual switches. In some embodiments, the control module 5 may have a digital signal processor (DSP) chip.

Figure 2:
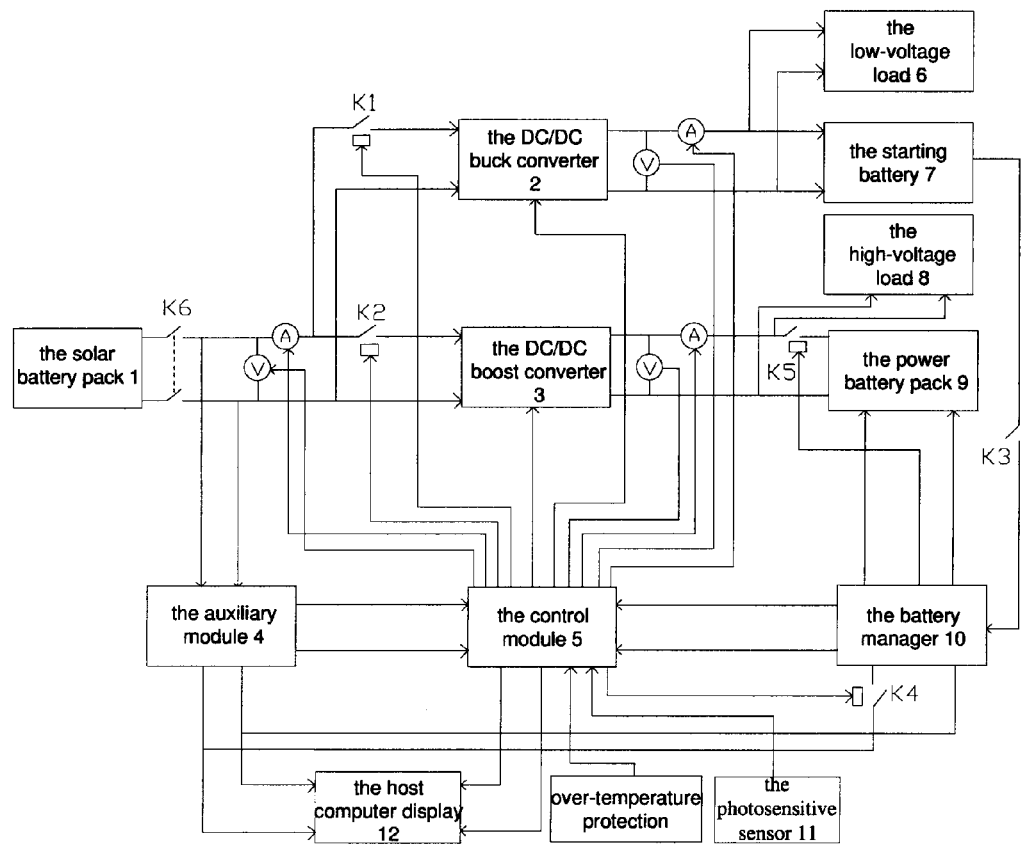
FIG. 2 is a schematic diagram illustrating a control system of a solar power supply according to another embodiment of the present invention.

As shown in FIG. 2, the schematic diagram illustrates a control system of a solar power supply according to another embodiment of the present invention. The output end of the solar power battery 1 has a service switch K6 configured for cutting off circuits between the solar power battery 1 and the DC/DC buck converter 2, between the solar power battery 1 and the DC/DC boost converter 3, between the solar power battery 1 and the control module 5, and between the solar power battery 1 and the auxiliary power module 4.

If an operator needs to repair the entire control system, the operator can open the service switch K6 to cut off the entire control system to ensure operation safety. A host computer display 12 is located between the auxiliary module 4 and the control module 5. The host computer display 12 may display the operation states of the entire control system. The operation states of the entire control system comprise, for some instance, the operation states of the DC/DC buck converter operates or the DC/DC boost converter, the output voltage and current of the solar battery pack, the output voltage and current of the DC/DC buck converter or the DC/DC boost converter, over-voltage, rectification efficiency, over-current, over-temperature, warning light, etc. In an actual operation, the host computer display 12 is convenient for a user to check the operation state of the entire control system and thereby to perform fault treatment timely. The host computer display 12 can display more states, such as states based on the requirements of the user, but not limited to aforementioned states.

An output end of the solar battery pack 1 has a voltmeter for detecting the output voltage of the solar battery pack 1 and an ammeter for detecting the output current of the solar battery pack 1. An output end of the DC/DC buck converter 2 has a voltmeter for detecting the output voltage of the DC/DC buck converter 2 and an ammeter for detecting the output current of the DC/DC buck converter 2. And an output end of the DC/DC boost converter 3 has a voltmeter for detecting the output voltage of the DC/DC boost converter 3 and an ammeter for detecting the output current of the DC/DC boost converter 3. Thereby, the control module 5 may sample the output voltages and currents of the solar battery pack 1, the DC/DC buck converter 2 and the DC/DC boost converter 3. Based on the sampled voltages and currents, the system can implement the MPPT (maximum power point tracking), output PWM waves to adjust the DC/DC buck converter 2 and the DC/DC boost converter 3 respectively. As a result, the utilization of the solar energy is improved. The MPPT (maximum power point tracking) is in the prior art, and does not require detailed description.

Another embodiment of the present invention discloses a control method of the aforementioned control system of the solar power supply. The control method includes: when an output power of the solar battery pack 1 is greater than a preset start power P of the auxiliary power module 4, the solar battery pack 1 provides power to the control module 5 via the auxiliary power module 4; detecting the state of the vehicle; when the vehicle is running, the solar battery pack provides power to the low-voltage load 6 and starting battery 7 via the DC/DC buck converter 2 under the control of the control module 5; when the vehicle is parked, the solar battery pack provides power to the power battery pack 9 via the DC/DC boost converter 3 under the control of the control module 5.

Furthermore, when the vehicle is running, the solar battery pack 1 provides power to the low-voltage load 6 and starting battery 7 via the DC/DC buck converter 2 under the control of the control module 5. This process can include the following steps of:

step 1: the control module 5 closing the third switch K3; the starting battery 7 providing power to the battery manager 10; the battery manager 10 performing self inspection; if the self inspection is successful, closing the main contactor K5, and the power battery pack 9 providing power to the high-voltage load 8, also sending instruction for closing the main contactor K5 to the control module 5;

step 2: the control module 5 sampling the output voltage of the solar battery pack 1 and the photosensitive sensor 11 sampling the sunlight; when the output voltage of the solar battery pack 1 is greater than or equal to a preset voltage C4 and the sunlight voltage sampled by the photosensitive sensor 11 is greater than or equal to a preset voltage C1 in a first preset time, closing the first switch K1;

step 3: the control module 5 sampling the output voltages and currents of the solar battery pack 1 and/or the output voltage and current of the DC/DC buck converter 2, then implementing maximum power point tracking based on the sampled voltages and currents, and outputting the PWM wave to adjust the DC/DC buck converter 2 for controlling the solar battery pack 1 to provide power to the low-voltage load 6 and starting battery 7 via the DC/DC buck converter 2.

Furthermore, when the vehicle is parked, the solar battery pack 1 provides power to the power battery pack 9 via the DC/DC boost converter 3 under the control of the control module 5. The process includes the following steps of:

step S1: the control module 5 cutting off the third switch K3 and closing the fourth switch K4; the auxiliary power module 4 providing power to the battery manager 9; if the self inspection is successful, closing the main contactor K5 and sending the instruction of closing the main contactor K5 to the control module 5;

step S2: the control module 5 sampling the output voltage of the solar battery pack 1 and the photosensitive sensor 11 sampling the sunlight, when the output voltage of the solar battery pack 1 is greater than or equal to the preset voltage C4 and the sunlight voltage sampled by the photosensitive sensor 11 is greater than or equal to the preset voltage C1 in the first preset time, closing the second switch K2;

step S3: the control module 5 sampling the output voltage and current of the solar battery pack 1 and/or the output voltage and current of the DC/DC boost converter 3, then implementing maximum power point tracking based on the sampled voltages and currents, and outputting the PWM wave to adjust the DC/DC boost converter 3 for controlling the solar battery pack 1 to provide power to the power battery pack 9 via the DC/DC boost converter 3.

Figure 3:
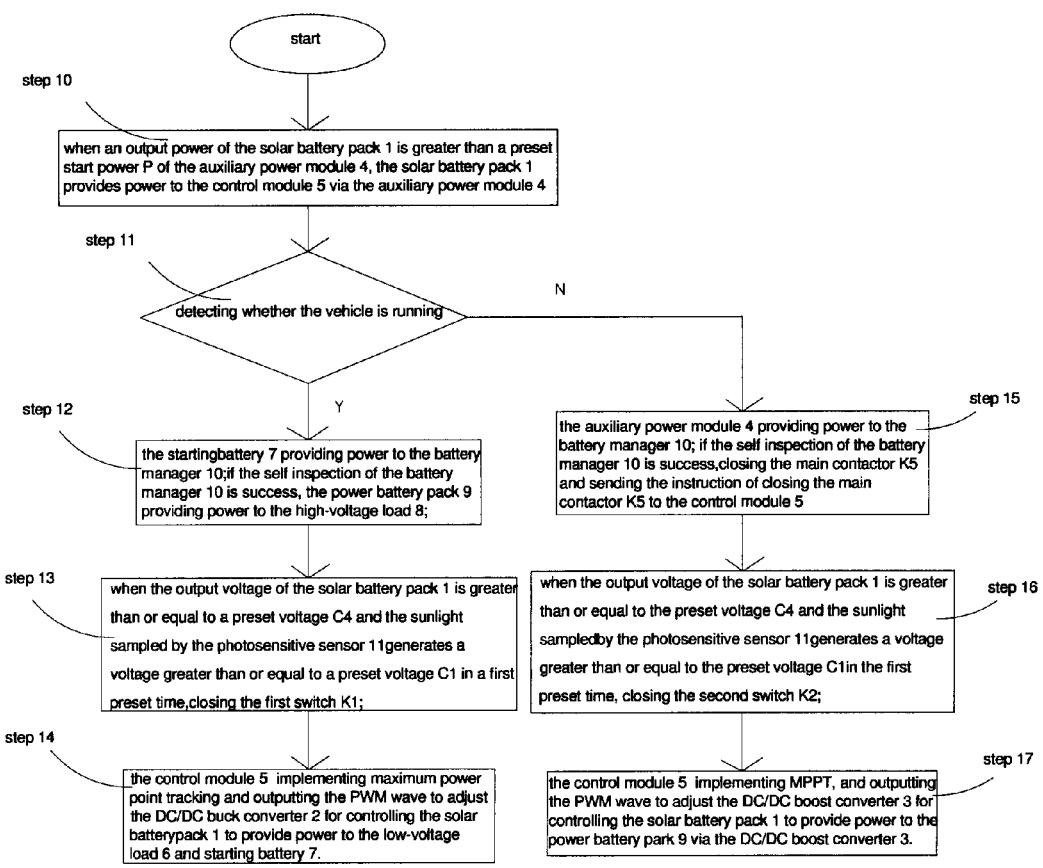
FIG. 3 is a flow chart illustrating a control method of a solar power supply according to an embodiment of the present invention.

FIG. 3 shows a flow chart that illustrates a control method of a solar power supply according to an embodiment of the present invention, which includes the following steps:

step 10: when the output power of the solar battery pack 1 is greater than a preset start power P of the auxiliary power module 4, the solar battery pack 1 providing power to the control module 5 via the auxiliary power module 4;

step 11: detecting the state of the vehicle; when the vehicle is running, performing the step 12; when the vehicle is parked, performing the step 15;

step 12: when the vehicle is running, the control module 5 closing the third switch K3, the solar battery pack 7 providing power to the battery manager 10, and the battery manager 10 performing self inspection; if the self inspection is successful, closing the main contactor K5 and the power battery pack 9 providing power to the high-voltage load 8, also sending the instruction of closing the main contactor K5 to the control module 5;

step 13: the control module 5 sampling the output voltage of the solar battery pack 1 and the photosensitive sensor 11 sampling the sunlight; when the output voltage of the solar battery pack 1 is greater than or equal to the preset voltage C4 and the sunlight voltage sampled by the photosensitive sensor 11 is greater than or equal to the preset voltage C1 in a first preset time, closing the first switch K1;

step 14: the control module 5 sampling the output voltages and currents of the solar battery pack 1 and/or the DC/DC buck converter 2, then implementing maximum power point tracking based on the sampled voltages and currents, and outputting the PWM wave to adjust the DC/DC buck converter 2 for controlling the solar battery pack 1 to provide power to the low-voltage load 6 and the starting battery 7 via the DC/DC buck converter 2;

step 15: when the vehicle is parked, the control module 5 cutting off the third switch K3 and closing the fourth switch K4; the auxiliary power module 4 providing power to the battery manager 10; if the self inspection of the battery manager 10 is successful, closing the main contactor K5 and sending the instruction of closing the main contactor K5 to the control module 5;

step 16: the control module 5 sampling the output voltage of the solar battery pack 1 and the photosensitive sensor 11 sampling the sunlight, when the output voltage of the solar battery pack 1 is greater than or equal to the preset voltage C4 and the sunlight voltage sampled by the photosensitive sensor 11 is greater than or equal to the preset voltage C1 in the first preset time, closing the second switch K2;

step 17: the control module 5 sampling the output voltages and currents of the solar battery pack 1 and/or the DC/DC boost converter 3, then implementing maximum power point tracking based on the sampled voltages and currents, and outputting the PWM wave to adjust the DC/DC boost converter 3 for controlling the solar battery pack 1 to provide power to the power battery pack 9 via the DC/DC boost converter 3.

In some embodiments of the present invention, the preset start power P of the auxiliary power module is 30 W~35 W, the first preset time is 5~10 seconds, the preset voltage C1 is 1V~3V, and the preset voltage C4 is 84V~126V.

In some embodiments of the present invention, for step 10, when the output power of the solar battery pack 1 is greater than the preset start power P of the auxiliary power module 4, the solar battery pack 1 provides power to the control module 5 via the auxiliary power module 4. The preset start power P of the auxiliary power module 4 is defined by design parameters of the auxiliary power module 4 and may be 30 W. From aforementioned description, the step 10 is performed only if the output power of the solar battery pack 1 is greater than the preset start power P of the auxiliary power module 4; if not, the entire control system does not work. That is, the solar battery pack 1 providing power to the control module 5 via the auxiliary power module 4 is not performed.

In some embodiments of the present invention, for step 11, detecting the state of the vehicle may comprise: the control module 5 detects whether the battery manager 10 sends out the instruction of closing the main contactor K5 in a preset time, in which, the preset time may be 20~30 seconds; if the battery manager 10 sends out the instruction, the vehicle is in a running state; if not, the vehicle is in a parked state. The description in step 11 includes only one method for detecting the state of the vehicle. Other methods, for example, by detecting that the state of an ignition switch (ON or OFF), can be used.

In some embodiments of the present invention, for step 12, when the vehicle is running, the control module 5 closes the switch K3, the solar battery pack 7 provides power to the battery manager 10, and the battery manager 10 performs self inspection; if the self inspection is successful. The process of the self inspection includes: 1) detecting whether the voltage of each cell in the power battery pack 9 is not over-voltage or under-voltage; 2) detecting whether the temperature of each cell in the power battery pack 9 is in a reasonable scope; 3) detecting whether the pre-charge of the main contactor is finished or not; 4) detecting whether leakage current of the entire vehicle is in a reasonable scope. The self inspection of the battery manager 10 is not limited to the above-noted four steps.

If the battery manager 10 performing self inspection is successful, the system closes the main contactor K5, the power battery 9 provides power to the high-voltage load 8 and the battery manager 10 sends out the instruction of closing the main contactor K5 to the control module 5; if the battery manager performing self inspection is not successful, the battery manager 10 performs the process of self inspection in loop until the self inspection is successful, then continuing to a next step.

In some embodiments of the present invention, for step 13, the control module 5 samples the output voltage of the solar battery pack 1 and the photosensitive sensor 11 samples the sunlight; when the output voltage of the solar battery pack 1 is greater than or equal to the preset voltage C4 and the sunlight voltage sampled by the photosensitive sensor 11 is greater than or equal to the preset voltage C1 in a first preset time (such as 5 seconds), closing the first switch K1; when the output voltage of the solar battery pack 1 is less than the preset voltage C4 and the sunlight voltage is less than the preset voltage C1 in a first preset time (such as 5 seconds), performing the process of sampling the output voltage of the solar battery pack 1 and the sunlight in loop until the output voltage of the solar battery pack 1 is greater than or equal to the preset voltage C4 and the sunlight voltage sampled by the photosensitive sensor 11 is greater than or equal to the preset voltage C1 in a first preset time, then continuing to a next step.

In some embodiments of the present invention, for step 14, the control module 5 samples the output voltages and currents of the solar battery pack 1 and/or the DC/DC buck converter 2, then implements maximum power point tracking based on the sampled voltages and currents, and outputs the PWM wave to adjust the DC/DC buck converter 2 for controlling the solar battery pack 1 to provide power to the low-voltage load 6 and the starting battery 7 via the DC/DC buck converter 2. Due to adopting the MPPT technology, the utilization of the solar energy may be further improved.

In some embodiments of the present invention, for step 15, the self inspection of the battery manager 10 is the same as the process in step 12.

In some embodiments of the present invention, for step 16, the control module 5 samples the output voltage of the solar battery pack 1 and the photosensitive sensor 11 samples the sunlight; when the output voltage of the solar battery pack 1 is greater than or equal to the preset voltage C4 and the sunlight voltage sampled by the photosensitive sensor 11 is greater than or equal to the preset voltage C1 in the first preset time (such as 5 seconds), closing the second switch K2; when the output voltage of the solar battery pack 1 is less than the preset voltage C4 and the sunlight voltage is less than the preset voltage C1 in a first preset time (such as 5 seconds), performing the process of sampling the output voltage of the solar battery pack 1 and the sunlight in loop until the output voltage of the solar battery pack 1 is greater than or equal to the preset voltage C4 and the sunlight voltage is greater than or equal to the preset voltage C1 in a first preset time, then continuing to a next step.

In some embodiments of the present invention, for step 17, the control module 5 samples the output voltages and currents of the solar battery pack 1 and/or the DC/DC boost converter 3, then implements maximum power point tracking based on the sampled voltages and currents, and outputs the PWM wave to adjust the DC/DC boost converter 3 for controlling the solar battery pack 1 to provide power to the power battery pack 9 via the DC/DC boost converter 3. At the moment, the power battery pack 9 stores the voltage for providing power to high-voltage load 8 when the vehicle is running.

In some embodiments of the present invention, when the vehicle is running, and when the sunlight voltage sampled by the photosensitive sensor is less than the preset voltage C1 in the first preset time (such as 5~10 seconds), the control module 5 cuts off the switch K1, and when the sunlight voltage sampled by the photosensitive sensor is greater than the preset voltage C3 in the third preset time (such as 4~5 seconds), the control module 5 closes the control switch K1.

When the vehicle is parked and if the sunlight voltage sampled by the photosensitive sensor is less than the preset voltage C1 in the first preset time (such as 5~10 seconds), the control module 5 cuts off the switch K2, and if the sunlight voltage sampled by the photosensitive sensor is greater than the preset voltage C3 in the third preset time (such as 4~5 seconds), the control module 5 closes the switch K2.

In embodiments of the present invention, when the DC/DC buck converter 2 or the DC/DC boost converter 3 has a safety failure, such as an under-voltage input, an over-voltage output, an over-current output, an over-temperature or the starting battery being fully charged, the control module 5 cuts off the first switch K1 or the second switch K2 to protect the entire control system. The safety failures of the DC/DC buck converter 2 may include:

the under-voltage input: when the output voltage of the solar battery pack 1 that is the input voltage of the DC/DC buck converter 2 is less than the preset voltage C2, the control module 5 cuts off the first switch K1;

the over-voltage output: when the output voltage of the DC/DC buck converter 2 is greater than the preset voltage C5, the control module 5 cuts off the first switch K1;

the over-current output: when the output current of the DC/DC buck converter 2 is greater than the preset current C6, the control module 5 cuts off the first switch K1;

the over-temperature: when a voltage sampled at an inner temperature of the DC/DC buck converter 2 is greater than a voltage C7 sampled at the preset temperature, the control module 5 cuts off the first switch K1;

the starting battery is fully charged: when the inner temperature of the DC/DC buck converter 2 is greater than the preset voltage C5, the control module 5 cuts off the first switch K1.

The safety failures of the DC/DC boost converter 3 may include:

the under-voltage input: when the output voltage of the solar battery pack 1 that is the input voltage of the DC/DC boost converter 3 is less than preset voltage C2, the control module 5 cuts off the first switch K2;

the over-voltage output: when the output voltage of the DC/DC boost converter 3 is greater than the preset voltage C8, the control module 5 cuts off the first switch K2;

the over-current output: when the output current of the DC/DC boost converter 3 is greater than the preset current C6, the control module 5 cuts off the first switch K2;

the over-temperature: when a voltage sampled at an inner temperature of the DC/DC boost converter 3 is greater than the voltage C7 sampled at the preset temperature, the control module 5 cuts off the first switch K2;

the starting battery is fully charged: when the output voltage of the DC/DC boost converter 3 is greater than the preset voltage C8, the control module 5 cuts off the first switch K2.

In embodiments of the present invention, the preset voltage C1 is 1V~3V, the preset voltage C2 is 80V~200V, the preset voltage C3 is 1.2V~3.6V, the preset voltage C4 is 84V~126V and the preset voltage C5 is U*120%. In which, U is the rated voltage of the starting battery 7, the preset current C6 is I*120%, in which, I is the rated output current of the DC/DC buck converter 2, the preset voltage C7 is 1V~3V and the preset voltage C8 is the voltage of the starting battery when it is fully charged. The preset times of the present invention are mainly set by the designer, not limited to the above time values, also other time values.

Although explanatory embodiments have been shown and described, it would be appreciated by those skilled in the art that changes, alternatives, and modifications can be made in the embodiments without departing from spirit and principles of the disclosure. Such changes, alternatives, and modifications all fall into the scope of the claims and their equivalents.

What is claimed is:

1. A control system of a solar power supply comprising:
a solar battery pack; a DC/DC buck converter; a DC/DC boost converter; a control module; a low-voltage load; a starting battery; a high-voltage load; a power battery pack; an auxiliary power module; a photosensitive sensor; a main contactor; a first switch; a second switch; a third switch; and a fourth switch;
wherein:
the solar battery pack is connected to the auxiliary power module, the control module, the DC/DC buck converter via the first switch, and the DC/DC boost converter via the second switch;

the DC/DC buck converter is connected to the low-voltage load, the starting battery and the control module;

the DC/DC boost converter is connected to the high-voltage load, the control module, the power battery pack via the main contactor;

the power battery pack is connected to a battery manager;

the control module is connected to the auxiliary power module, the battery manager and the photosensitive sensor;

the auxiliary power module is connected to the battery manager via the fourth switch; and the battery manager is connected to the starting battery via the third switch.

2. The control system of claim 1, wherein the first switch, second switch, third switch and fourth switch are electric control relays.

3. The control system of claim 1, wherein an output end of the solar battery pack has a service switch for cutting off circuits between the solar battery pack and the DC/DC buck converter, between the solar battery pack and the DC/DC boost converter, between the solar battery pack and the control module and between the solar battery pack and the auxiliary power module.

4. The control system of claim 1, wherein a host computer display is connected between the auxiliary power module and the control module.

5. The control system of claim 1, wherein an output end of the solar battery pack has a voltmeter for detecting an output voltage of the solar battery pack and an ammeter for detecting an output current of the solar battery pack.

6. The control system of claim 1, wherein an output end of the DC/DC buck converter has a voltmeter for detecting an output voltage of the DC/DC buck converter and an ammeter for detecting an output current of the DC/DC buck converter.

7. The control system of claim 1, wherein an output end of the DC/DC boost converter has a voltmeter for detecting an output voltage of the DC/DC boost converter and an ammeter for detecting an output current of the DC/DC boost converter.

8. The control system of claim 1, wherein the control module has a DSP chip.

9. A control method for providing solar power supply to a vehicle comprising:

when an output power of a solar battery pack is greater than a preset start power P of an auxiliary power module, the solar battery pack providing power to a control module via the auxiliary power module;

detecting a state of the vehicle;

when the vehicle is running, the solar battery pack providing power to a low-voltage load and a starting battery via a DC/DC buck converter under the control of the control module;

when the vehicle is parked, the solar battery pack providing power to a power battery pack via a DC/DC boost converter under the control of the control module.

10. The control method of claim 9, wherein:

the step of the solar battery pack providing power to a low-voltage load and a starting battery via a DC/DC buck converter under the control of the control module comprises:

the starting battery providing power to a battery manager; the battery manager performing a self inspection; if the self inspection is successful, the power battery pack providing power to the high-voltage load;

the control module sampling an output voltage of the solar battery pack and a photosensitive sensor sampling sunlight; when the output voltage of the solar battery pack is greater than or equal to a preset voltage C4 and the sunlight sampled by the photosensitive sensor generates a voltage greater than or equal to a preset voltage C1 in a first preset time, closing a first switch between the solar battery pack and the DC/DC buck converter; and the control module sampling an output voltage and current of the solar battery pack and/or an output voltage and current of the DC/DC buck converter, implementing maximum power point tracking based on the sampled voltage and current, and outputting a PWM wave to adjust the DC/DC buck converter for controlling the solar battery pack to provide power to the low-voltage load and starting battery via the DC/DC buck converter.

11. The control method of claim 10, wherein the process further including:

when the voltage generated by the photosensitive sensor is less than the preset voltage C1 in a third preset time, cutting off the first switch;

when the voltage generated by the photosensitive sensor is greater than the preset voltage C3 in a fourth preset time, closing the first switch;

when the DC/DC buck converter has an under-voltage input, an over-voltage output, an over-current output, an over-temperature output, or the starting battery is fully charged, cutting off the first switch.

12. The control method of claim 9, wherein:

the step of the solar battery pack providing power to a power battery pack via a DC/DC boost converter under the control of the control module comprises:

the auxiliary power module providing power to a battery manager; the battery manager performing a self inspection; if the self inspection is successful, the power battery pack providing power to the high-voltage load;

the control module sampling an output voltage of the solar battery pack and the photosensitive sensor sampling the sunlight, when the output voltage of the solar battery pack is greater than or equal to a preset voltage C4 and the sunlight sampled by the photosensitive sensor generates a voltage greater than or equal to a preset voltage C1, closing a second switch between the solar battery pack and the DC/DC boost converter; and the control module sampling an output voltage and current of the solar battery pack and/or an output voltage and current of the DC/DC boost converter, implementing maximum power point tracking based on the sampled voltage and current, and outputting a PWM wave to adjust the DC/DC boost converter for controlling the solar battery pack to provide power to the power battery pack via the DC/DC boost converter.

13. The control method of claim 12, wherein the process further comprises:

when the voltage generated by the photosensitive sensor is less than the preset voltage C1 in the third preset time, cutting off the second switch;

when the voltage generated by the photosensitive sensor is greater than the preset voltage C3 in the fourth preset time, closing the second switch;

when the DC/DC boost converter has an under-voltage input, an over-voltage output, an over-current output, an over-temperature, or the power battery is fully charged, cutting off the second switch.

14. The control method of claim 10, wherein the self inspection of the battery manager comprises:

detecting whether a voltage of each cell in the power battery pack is over-voltage or under-voltage;

detecting whether a temperature of each cell in the power battery pack is in a reasonable scope;

detecting whether a pre-charge of a main contactor is finished or not; or detecting whether a leakage current of the vehicle is in a reasonable scope.

15. The control method of claim 10, wherein the preset start power P of the auxiliary power module is 30 W~35 W, the first preset time is 5~10 seconds, the third preset time is 2~3 seconds, the fourth preset time is 4~5 seconds, the preset voltage C1 is 1V~3V, the preset voltage C3 is 1.2V~3.6V, the preset voltage C4 is 84V~126V.

16. The control method of claim 11, wherein the preset start power P of the auxiliary power module is 30 W~35 W, the first preset time is 5~10 seconds, the third preset time is 2~3 seconds, the fourth preset time is 4~5 seconds, the preset voltage C1 is 1V~3V, the preset voltage C3 is 1.2V~3.6V, the preset voltage C4 is 84V~126V.

17. The control method of claim 10, further comprising:
if the battery manager performing self inspection is not successful, performing the process of self inspection in a loop until the self inspection is successful, and then continuing to perform a next step.

18. The control method of claim 10, further comprising:
when the output voltage of the solar battery pack is less than a preset voltage C4 and the voltage generated by the photosensitive sensor is less than or equal to a preset voltage C1 in a first preset time, performing the process of self inspection in a loop until the output voltage of the solar battery pack is greater than or equal to a preset voltage C4 and the voltage generated by the photosensitive sensor is greater than or equal to a preset voltage C1, and then continuing to perform a next step.

19. The control method of claim 9, wherein detecting the state of the vehicle comprises:
detecting whether the battery manager sends out an instruction of closing a main contactor in the second preset time; if the battery manager sends out the instruction of closing the main contactor in the second preset time, the vehicle is running; otherwise, the vehicle is parked.

20. The control method of claim 18, wherein the second preset time is 20~30 seconds.

21. A control system of a solar power supply comprising:
a solar battery pack;
a DC/DC buck converter;
a DC/DC boost converter;
a control module;
a starting battery;
a power battery pack;
an auxiliary power module; and
a photosensitive sensor;
wherein:
the solar battery pack is connected to the auxiliary power module, the control module, the DC/DC buck converter, and the DC/DC boost converter;
the DC/DC buck converter is connected the starting battery and the control module;
the DC/DC boost converter is connected to the control module and the power battery pack;
the power battery pack is connected to a battery manager;
the control module is connected to the auxiliary power module, the battery manager and the photosensitive sensor;
the auxiliary power module is connected to the battery manager; and
the battery manager is connected to the starting battery.

* * * * *